US011151833B2

(12) United States Patent
Hemerick et al.

(10) Patent No.: US 11,151,833 B2
(45) Date of Patent: Oct. 19, 2021

(54) GAMING MACHINE DISPLAY DEVICE MOUNT SYSTEM

(71) Applicant: IGT, Las Vegas, NV (US)

(72) Inventors: Bradley Hemerick, Sparks, NV (US); John Leagh Beadell, Sparks, NV (US); Jack H. Brooks, Reno, NV (US); Brandon J. Seaman, Reno, NV (US); Jacob Wik, Reno, NV (US)

(73) Assignee: IGT, Las Vegas, NV (US)

( * ) Notice: Subject to any disclaimer, the term of this patent is extended or adjusted under 35 U.S.C. 154(b) by 5 days.

(21) Appl. No.: 16/672,225

(22) Filed: Nov. 1, 2019

(65) Prior Publication Data

US 2021/0134109 A1 May 6, 2021

(51) Int. Cl.

| | |
|---|---|
| ***A63F 9/24*** | (2006.01) |
| ***A63F 13/00*** | (2014.01) |
| ***G07F 17/00*** | (2006.01) |
| ***G07F 17/32*** | (2006.01) |
| ***G07F 9/10*** | (2006.01) |

(52) U.S. Cl.

CPC ............ *G07F 17/3216* (2013.01); *G07F 9/10* (2013.01); *G07F 17/3211* (2013.01); *G07F 17/3223* (2013.01)

(58) Field of Classification Search

CPC .................................................. G07F 17/3202

See application file for complete search history.

(56) References Cited

U.S. PATENT DOCUMENTS

| | | | | |
|---|---|---|---|---|
| 2019/0096170 | A1* | 3/2019 | Lewis | G07F 17/3216 |
| 2019/0096174 | A1* | 3/2019 | Ambrecht | G07F 17/3209 |

* cited by examiner

*Primary Examiner* — Milap Shah
*Assistant Examiner* — Jason Pinheiro
(74) *Attorney, Agent, or Firm* — Sheridan Ross P.C.

(57) ABSTRACT

The present disclosure relates generally to a gaming machine display device mount system including a mount frame that slidably interconnects with a receiver bracket installed in a cabinet of a gaming machine. A display device is attached to the mount frame and, prior to assembling the mount frame to the receiver bracket, the cabling of the display device is coiled and contained within a portion of the mount frame. The display device and the mount frame together form a display mount assembly, which is then interconnected with the receiver bracket 128 in the gaming machine. Once interconnected, the mount frame is fastened to the receiver bracket from the interior compartment of the gaming machine providing a secure tamperproof assembly. The gaming machine display device mount system allows a single installer to assemble the display mount assembly to the gaming machine safely and without assistance.

20 Claims, 11 Drawing Sheets

GAMING MACHINE DISPLAY DEVICE MOUNT SYSTEM

BACKGROUND

The present disclosure is generally directed to gaming machines and, in particular, toward mount systems for display devices attached to gaming machines.

Gaming machines utilize a combination of user interfaces, lights, speakers, and effects that engage players and enhance interactive experiences. A typical gaming machine comprises a cabinet, a primary interface panel, and one or more display devices attached to, or disposed within, the cabinet. A display device that is attached to the uppermost portion of a gaming machine, also known as the topper, may be used to render graphics, video clips, and/or other effects associated with the gaming machine.

Attaching a conventional topper to a gaming machine requires a series of operations to be performed by multiple assembly technicians. The topper must be lifted and held above the top of the gaming machine by an assembly technician while the cabling for the display is routed into the cabinet of the gaming machine by another assembly technician. Next, the topper is lowered into its mount position where the display device is once again held in place by an assembly technician while the other assembly technician fastens the topper to the top of the cabinet. Only when the topper has been completely fastened to the cabinet can the assembly technician release the topper.

BRIEF SUMMARY

In certain embodiments, the present disclosure relates to display device mount system for gaming machines. In some embodiments, a display mounting system is provided, comprising: a mount frame, comprising: a substantially planar body extending a width and a height, the width and the height defining a first area; a pair of sidewalls extending in a first direction away from the substantially planar body, the pair of sidewalls disposed at opposing edges of the width of the substantially planar body; a cable receiving space defined between the pair of sidewalls and the substantially planar body; and a display device mount surface attached to the substantially planar body; and a receiver bracket, comprising: a body comprising a first side and a second side; a first side rail disposed on the first side of the body and extending from the body a first distance in the first direction, the first side rail comprising a first lip extending a lip distance toward a center of the body; and a second side rail disposed on the second side of the body and extending from the body in the first direction, the second side rail comprising a second lip extending toward the center of the body, wherein at least a portion of the mount frame is engageable with the receiver bracket between a detached state and an attached state, wherein the detached state comprises a physical distance separating the mount frame from the receiver bracket, wherein the attached state comprises a physical contact of the mount frame with the receiver bracket, and wherein, in the attached state, the pair of sidewalls are retained by the first and second side rails of the receiver bracket.

In some embodiments, a display mount frame system is provided, comprising: a display mount frame, comprising: a plate comprising an area defined by a width running from a first side to a second side of the plate and a height running from an upper edge to a lower edge of the plate; a first sidewall extending a first distance from the first side of the plate, wherein the first sidewall is disposed substantially perpendicular to the plate; a second sidewall extending a second distance from the second side of the plate, wherein the second sidewall is disposed substantially perpendicular to the plate; an angled cutout of material disposed at opposing corners of the lower edge of the plate; an angled portion of the first sidewall bent inwardly toward a center of the plate and affixed to the plate adjacent a first corner of the opposing corners of the lower edge of the plate; an angled portion of the second sidewall bent inwardly toward the center of the plate and affixed to the plate adjacent a second corner of the opposing corners of the lower edge; and a display device mount surface attached to the upper edge of the plate; and a display device fastened to the display device mount surface, the display device, comprising: a display screen that, when energized, renders images to pixels of the display screen; and cabling electrically interconnected to the display screen, the cabling comprising at least one of a power cable, a video information transfer cable, and an audio information transfer cable.

In some embodiments, a gaming machine is provided, comprising: a cabinet separating an interior space of the gaming machine from an exterior of the gaming machine; a receiver bracket attached to the cabinet from the interior space and providing an opening from the exterior of the gaming machine to the interior space of the gaming machine, the receiver bracket, comprising: a body comprising a first side and a second side; a first side rail disposed on the first side of the body and extending from the body in a first direction away from the body, the first side rail comprising a first lip extending a lip distance toward a center of the body; and a second side rail disposed on the second side and extending from the body in the first direction, the second side rail comprising a second lip extending toward the center of the body; a display mount frame, comprising: a substantially planar body extending a width and a height, the width and the height defining a first area; a pair of sidewalls extending from the substantially planar body in the first direction, the pair of sidewalls disposed at opposing edges of the width of the substantially planar body; a cable receiving space defined between the pair of sidewalls and the substantially planar body; and a display device mount surface attached to the substantially planar body; and a display device attached to the display device mount surface of the display mount frame, wherein the display mount frame is engageable with the receiver bracket between a detached state and an attached state, wherein the detached state comprises a physical distance separating the display mount frame and the display device from the receiver bracket and the gaming machine, wherein the attached state comprises a contact of the display mount frame with the receiver bracket, wherein, in the attached state, the pair of sidewalls are retained by the first and second side rails of the receiver bracket and cabling of the display device is coiled and secured completely within the cable receiving space.

Additional features and advantages are described herein and will be apparent from the following Description and the figures.

DETAILED DESCRIPTION

Figure 1A:
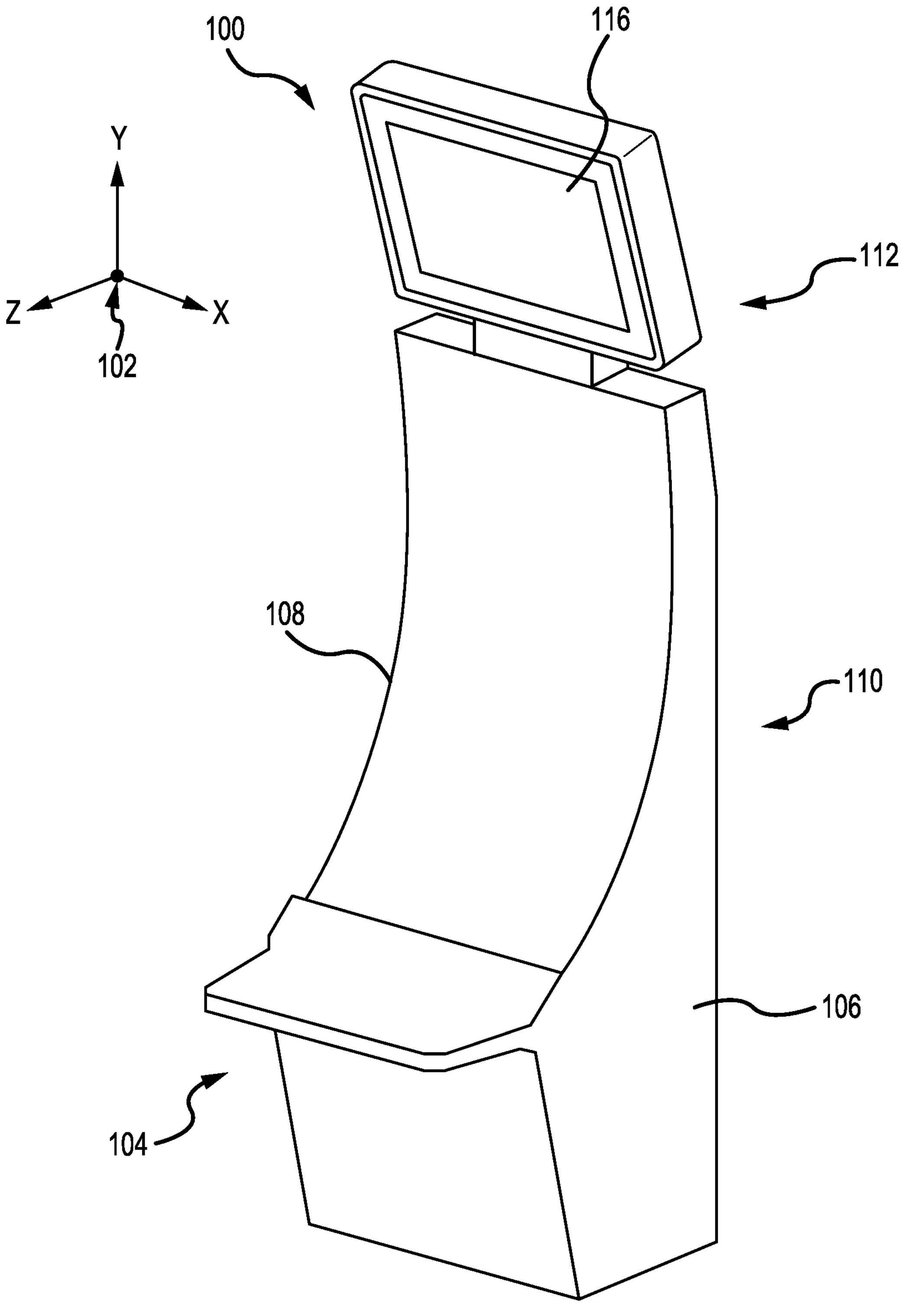
FIG. 1A is a perspective view of a gaming machine display device mount system in accordance with embodiments of the present disclosure.

It is with respect to the above issues and other problems that the embodiments presented herein were contemplated. With the trend of larger heavier displays, the risk of damage or injury is increased when installing a heavy topper/display above head height. With the gaming machine display device mount system described herein, the topper can be lifted and set into the installed position and remain secure without fasteners or assistance. Stated another way, the assembly of the topper, or display mount assembly, to a gaming machine can be safely completed by a single assembly technician. The topper cannot be removed or separated from the gaming machine without lifting it several inches, eliminating the chance of the topper falling from the gaming machine.

In some embodiments, the display mount assembly may be secured to the main cabinet of the gaming machine via internal fasteners. Among other things, this internal fastening approach offers additional security when compared to conventional external display mount fasteners. For instance, in conventional designs the fasteners are installed from the exterior of a gaming machine, which allowed for removal of the topper without gaining authorized access to the interior of the machine. This approach causes a security and a safety risk to people interacting with the gaming machine. In some embodiments of the present disclosure, the fasteners securing the topper are located in the internal/lockable portion of the gaming machine cabinet, and when locked, the topper cannot be removed and access to the interior space of the gaming machine is prevented.

Additionally or alternatively, the present disclosure provides easy access to the securing fasteners. In conventional designs the fasteners may be located at the base of the topper above the gaming machine (e.g., external to the interior space of the gaming machine). Access to external fasteners may be problematic with the trend of taller gaming machines and adjacent accent displays/infills blocking access to fasteners located above the machine. In some embodiments, the gaming machine display device mount system design eliminates the need for external fasteners above the gaming machine cabinet, allowing the installer or assembly technician to access forward facing fasteners in the internal/service portion of the gaming machine.

In some embodiments, the present disclosure provides a gaming machine display device mount system that eliminates the requirement for feeding cabling into the gaming machine while holding and supporting the topper (e.g., in an unsecured state, etc.) above the mounting surface of the gaming machine. In conventional designs the cabling must be "fished" through the topper mounting hole in the top of the cabinet, while holding the topper above the cabinet. This conventional approach requires a second person (e.g., assembly technician) to manage/route the cabling while the topper is manually supported above the cabinet. It is an aspect of the present disclosure that the mounting system disclosed herein contains a protected/dedicated area of the topper mount for cable/harnessing to be pre-bundled and temporarily secured to aid in installation. Among other things, this bundling and securing of cables in the mount frame of the gaming machine display device mount system eliminates the requirement to feed cabling/harnessing into the cabinet prior to placing the topper on the cabinet of the gaming machine.

In some embodiments, the gaming machine display device mount system allows for the secure mounting of a large format liquid crystal display (LCD), or other display device, on the top of a gaming machine. In one embodiment, the system utilizes a receiver bracket secured to the main cabinet and a mount/frame that is incorporated into the topper, or display mount assembly. Using this system, a large/heavy topper can be lifted into position and slid downward into a receiving bracket which supports and constrains the topper in the installed position. Once lowered into position, the installer can continue with gaming machine preparation without concern of the topper falling or becoming unstable. Once the topper is placed into position, the installer can complete installation by moving to the front of the open gaming machine and securing the display mount assembly with fasteners located in the internal/lockable cavity of the gaming machine. Among other things, this approach utilizes easily accessed forward facing fasteners located in a top portion of the internal lockable machine enclosure. Once the topper is placed and is self-supported, the installer can complete installation from the front of the opened gaming machine. The internal fasteners eliminate the requirement to access the sides/rear areas above the gaming machine to complete installation.

In some embodiments, the topper mount, or display mount assembly, utilizes a protected area that contains the pre-installed electrical harnessing/cabling required for the electronics in the topper to function. With this approach the cabling is self-contained and protected in the topper mount during installation and while the topper is set atop the gaming machine. Once the topper is placed into the receiving bracket, the bundled cable/harnessing can be pulled from the interior of the cabinet and routed to the appropriate connections from the front of the gaming machine while the topper is securely held in place by the receiver bracket.

The terms "gaming machine" and "Electronic Gaming Machine (EGM)" as used herein may refer to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

With reference initially to FIGS. 1A-1D, details of a gaming machine display device mount system 100 will be described in accordance with at least some embodiments of the present disclosure. The components gaming machine display device mount system 100, while depicted as having particular components and arrangements, are not necessarily limited to the examples depicted herein. For instance, the features of the gaming machine display device mount system 100 may be employed in any component-to-component attachment system and are not limited to attaching a display mount assembly 112 to a gaming machine 104.

In some embodiments, reference may be made to dimensions, angles, directions, relative positions, and/or movements associated with one or more components of the gaming machine display device mount system 100 with respect to a coordinate system 102. The coordinate system 102, as shown in the accompanying figures, includes three-dimensions comprising an X-axis, a Y-axis, and a Z-axis. Additionally or alternatively, the coordinate system 102 may be used to define planes (e.g., the XY-plane, the XZ-plane, and the YZ-plane) of the gaming machine display device mount system 100. These planes may be disposed orthogonal, or at 90 degrees, to one another. While the origin of the coordinate system 102 may be placed at any point on or near the gaming machine display device mount system 100 for the purposes of description, the axes of the coordinate system 102 are always disposed along the same directions from figure to figure. As shown in FIG. 1A, the width of the gaming machine 104 may be defined as a dimension along the X-axis, the height of the gaming machine 104 may be defined as a dimension along the Y-axis, and the depth of the gaming machine 104 may be defined as a dimension along the Z-axis. Other dimensions, angles, and relative positions of the one or more components of the gaming machine display device mount system 100 may be as described herein.

The gaming machine display device mount system 100 may comprise a display mount assembly 112, or topper, that attaches to a gaming machine 104 via one or more interface components (e.g., display mount frame 120, receiver bracket 128, etc.). It is an aspect of the present disclosure that, during assembly of the display mount assembly 112 to the gaming machine 104, an assembly technician may insert a mount frame 124 of the display mount assembly 112 into a receiving space of a receiver bracket 128 fixed in the gaming machine 104. This attachment of the display mount assembly 112 to the gaming machine 104 allows the assembly technician to securely mount the display mount assembly 112 in a safe installed position and complete the installation of the display mount assembly 112 without requiring assistance from another person. For instance, the display mount assembly 112 may be engaged with and attached to the gaming machine 104 safely holding the display mount assembly 112 in place prior to fastening the mount frame 124 to the receiver bracket 128. In some embodiments, the mount frame 124, the receiver bracket 128, the display mount frame 120, and/or portions of the cabinet 106 or the gaming machine display device mount system 100 may be made from, but are in no way limited to, sheet metal, machined metal, formed metal (e.g., cast metal, selective laser sintered metal, extruded metal, stamped metal, bent metal, etc., and/or combinations thereof) plastic (e.g., thermoformed plastic, injection molded plastic, rotational molded plastic, blow molded plastic, extrusion molded plastic, etc., and/or combinations thereof) welded components (e.g., weldments made by joining multiple parts together, for example, via metal welding, plastic welding, ultrasonic welding, tack welding, and/or the like), bolted, or fastened, together components (e.g., boltments), and/or combinations thereof.

The gaming machine 104 may correspond to a type of device that enables user interaction in connection with playing games of chance, making wagers, and/or watching events or effects associated with the games of chance. For instance, the gaming machine 104 may correspond to a type of device that enables a player to play games, wager on, and in some cases, even watch events via a display device 116 of the gaming machine 104. The gaming machine 104 may include any type of known gaming device such as a slot machine, a table game, an electronic table game (e.g., video poker), a skill-based game, etc. The gaming machine 104 can be in the form of an EGM, mechanical gaming machine, video game gambling machine, etc. The gaming machine 104 may comprise a cabinet 106 and a gaming interface panel 108 attached to the cabinet 106 (e.g., via one or more fasteners, tabs, pins, etc.). In some embodiments, the gaming interface panel 108, and/or other lockable panel, of the gaming machine 104 may securely separate an interior compartment 130 of the gaming machine 104 from an exterior space 110 surrounding the gaming machine 104. Additionally or alternatively, the gaming machine 104 may correspond to a kiosk used for purposes other than enabling a player to interact with a game.

The gaming interface panel 108 may correspond to a main, or primary, panel of the gaming machine 104. The gaming interface panel 108 may include graphics, lights, icons, symbols, etc., that provide a player with information about a game of the gaming machine 104. In some embodiments, the gaming interface panel 108 may correspond to a glass, or plastic, panel and frame that is physically attached to the cabinet 106 of the gaming machine 104. In one embodiment, the gaming interface panel 108 may include gaming information, decorated surfaces, and/or clear sections that allow mechanisms, displays, lights, mechanical reels, and/or other elements of the gaming machine 104 that are disposed within the interior compartment 130 to be viewed from the exterior space 110 of the gaming machine 104.

In some embodiments, the display mount assembly 112 may correspond to the topper of the gaming machine 104 comprising a display device 116, a display mount frame 120, and a mount frame 124. The display mount assembly 112 may attach to a gaming machine 104 by interconnecting the mount frame 124 with a receiver bracket 128 that is mounted to the inside of the cabinet 106 of the gaming machine 104. In one embodiment, the display mount assembly 112 and/or the display device 116 may be disposed at an angle relative to a player of the gaming machine 104. For instance, the display mount assembly 112 and/or the display device 116 may be angled toward the player (e.g., rotated about the X-axis toward a player facing a front of the gaming machine 104). The front of the gaming machine 104 may be defined as the area of the gaming machine disposed in the positive Z-axis direction. In one embodiment, the display mount assembly 112 may be substantially coplanar with the XY-plane.

The display device 116 may correspond to an LCD, light emitting diode (LED) display, organic LED, active-matrix organic LED, touchscreen display, and/or any other display device capable of rendering images to a screen portion of the display device 116. Although shown in the form of a substantially rectangular shape, it should be appreciated that the display may be of any shape including, but in no way limited to, a square, circle, ovoid, triangle, polygon, etc., and/or combinations thereof. In some embodiments, the display device 116 may comprise a number of pixels that substantially fill an area of the screen of the display device 116.

The display mount frame 120 may comprise a frame that at least partially surrounds a portion of the display device 116 and/or supports the display device 116. In some embodiments, the display mount frame 120 may comprise material that connects the display device 116 to the mount frame 124. In one embodiment, the display mount frame 120 may comprise a shield or cover that shrouds a portion of the display device 116. The display mount frame 120 may prevent unauthorized access by an individual outside of the gaming machine 104 interfering with the cabling, electronics, and/or mount features of the display device 116. The display mount frame 120 may be attached to the display device 116, the mount frame 124, and/or other portion of the gaming machine 104.

Figure 1B:
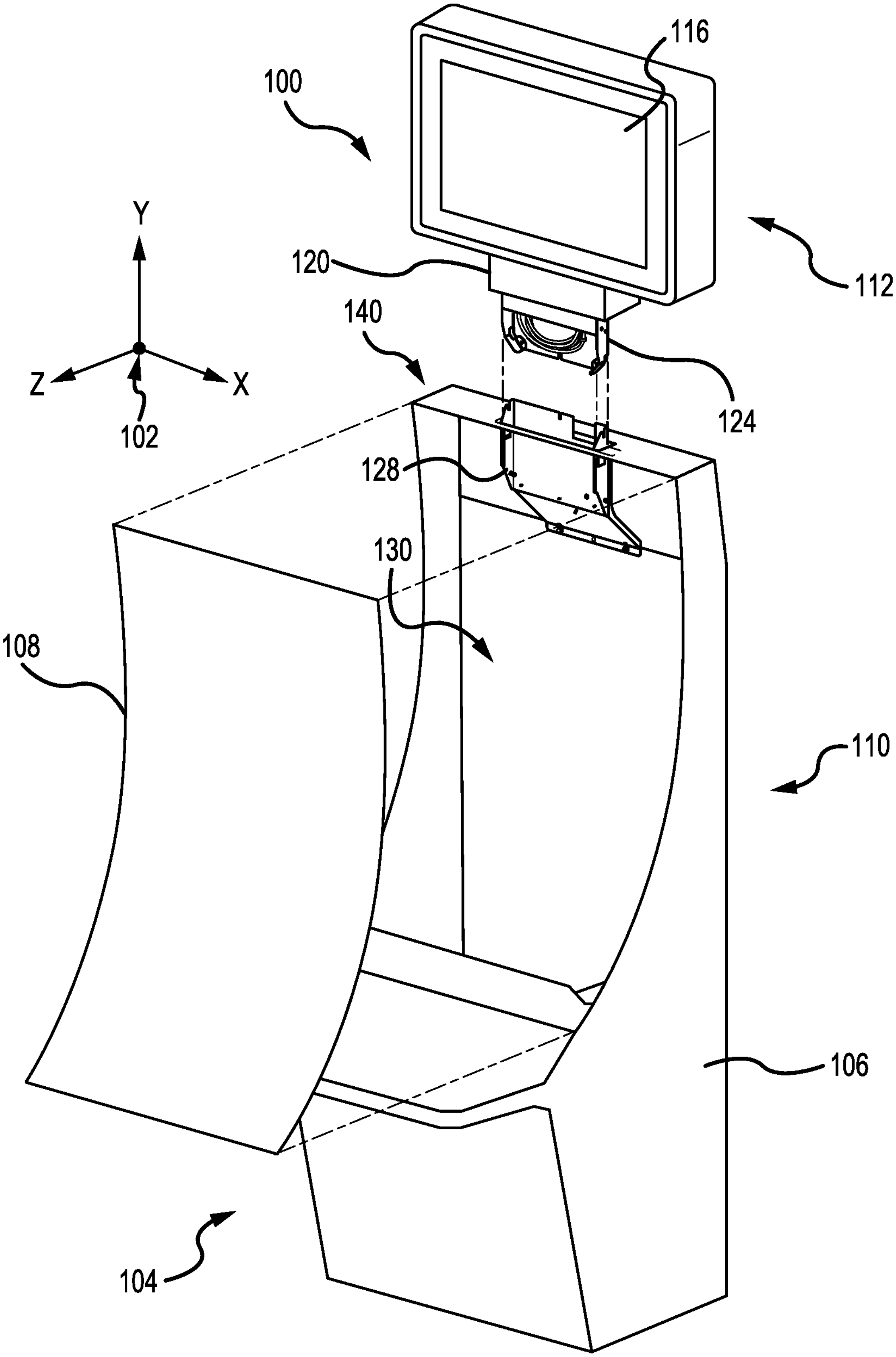
FIG. 1B is an exploded perspective view of the gaming machine display device mount system of FIG. 1A.

As shown in the exploded perspective view of FIG. 1B, the gaming interface panel 108 may be unlocked and separated from the cabinet 106 to expose the interior compartment 130 of the gaming machine 104 to an authorized assembly technician. During assembly, the receiver bracket 128 may be attached, or fastened, to the cabinet 106 in the interior compartment 130. In one embodiment, the receiver bracket 128 may be fastened to an interior rear surface of the cabinet 106. The receiver bracket 128 may provide an opening disposed in the top surface 140 of the cabinet 106 into which the mount frame 124 of the display mount assembly 112 may be inserted. In some embodiments, the mount frame 124 may be positioned above the top surface 140 of the gaming machine 104 and moved such that the mount frame 124 engages with the receiver bracket 128 and slides along the Y-axis into a positively-attached position. The slidable engagement length may be greater than or equal to 4.0 inches, and in some cases, may be greater than or equal to 5.0 inches. In any event, the slidable engagement length may be at least two times the depth of the mount frame 124 and/or the receiver bracket 128 (e.g., as measured in the Z-axis direction). Once engaged, the display mount assembly 112 may be held by the receiver bracket 128 such that the display mount assembly 112 does not accidentally displace, dislodge, or move.

The display mount assembly 112 may be fastened in an affixed state by one or more fasteners. For instance, the mount frame 124 may be fastened to the receiver bracket 128 from the interior compartment 130 of the gaming machine 104. In some embodiments, the fasteners and other elements may be disposed entirely within the interior compartment 130 providing a secure attachment of the display mount assembly 112 to the gaming machine 104 when the gaming interface panel 108 is attached and/or locked to the front of the gaming machine 104.

Figure 1C:
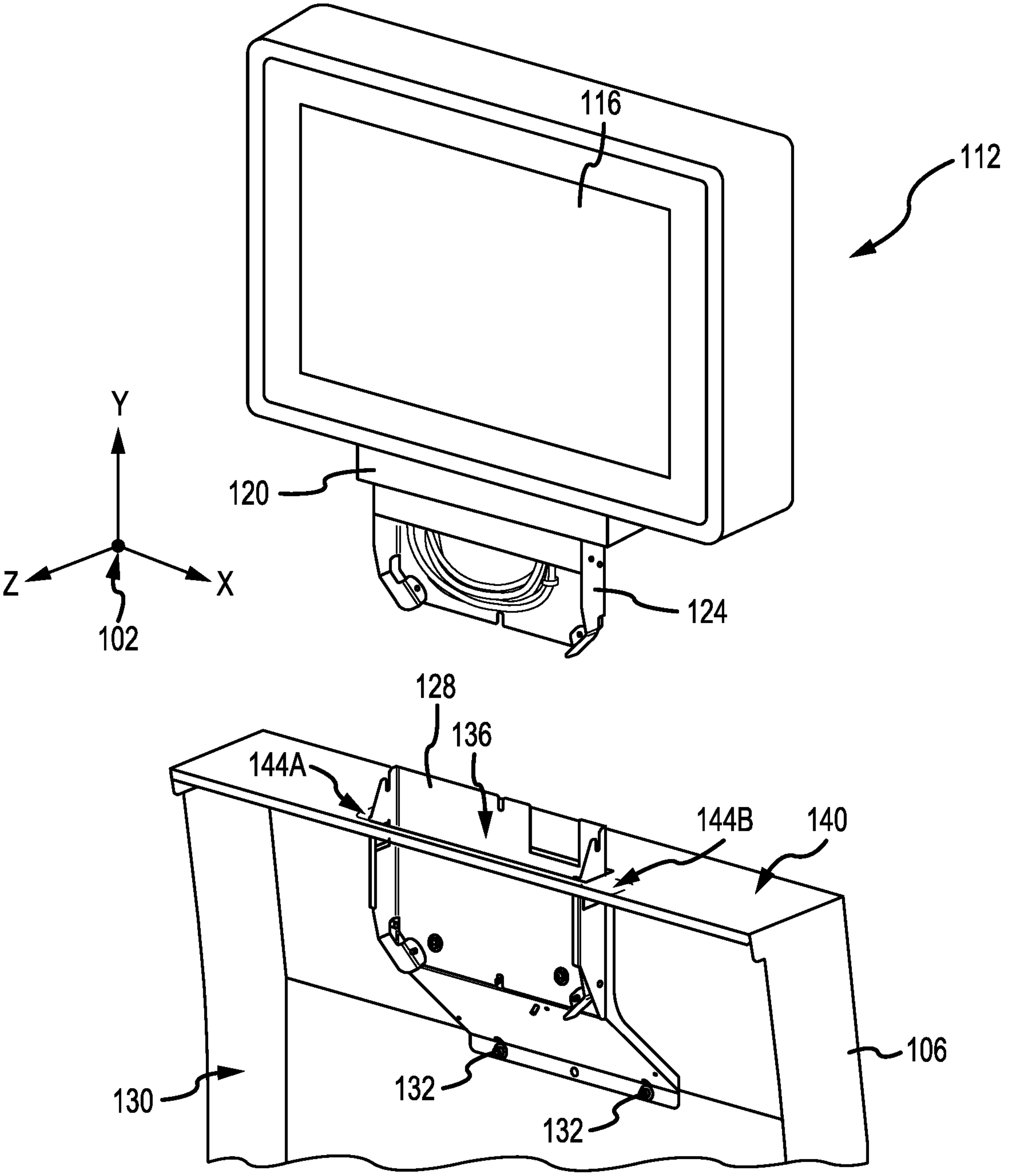
FIG. 1C is a detail perspective view of the top of a gaming machine with a display mount assembly detached from the gaming machine in accordance with embodiments of the present disclosure.
Figure 1D:
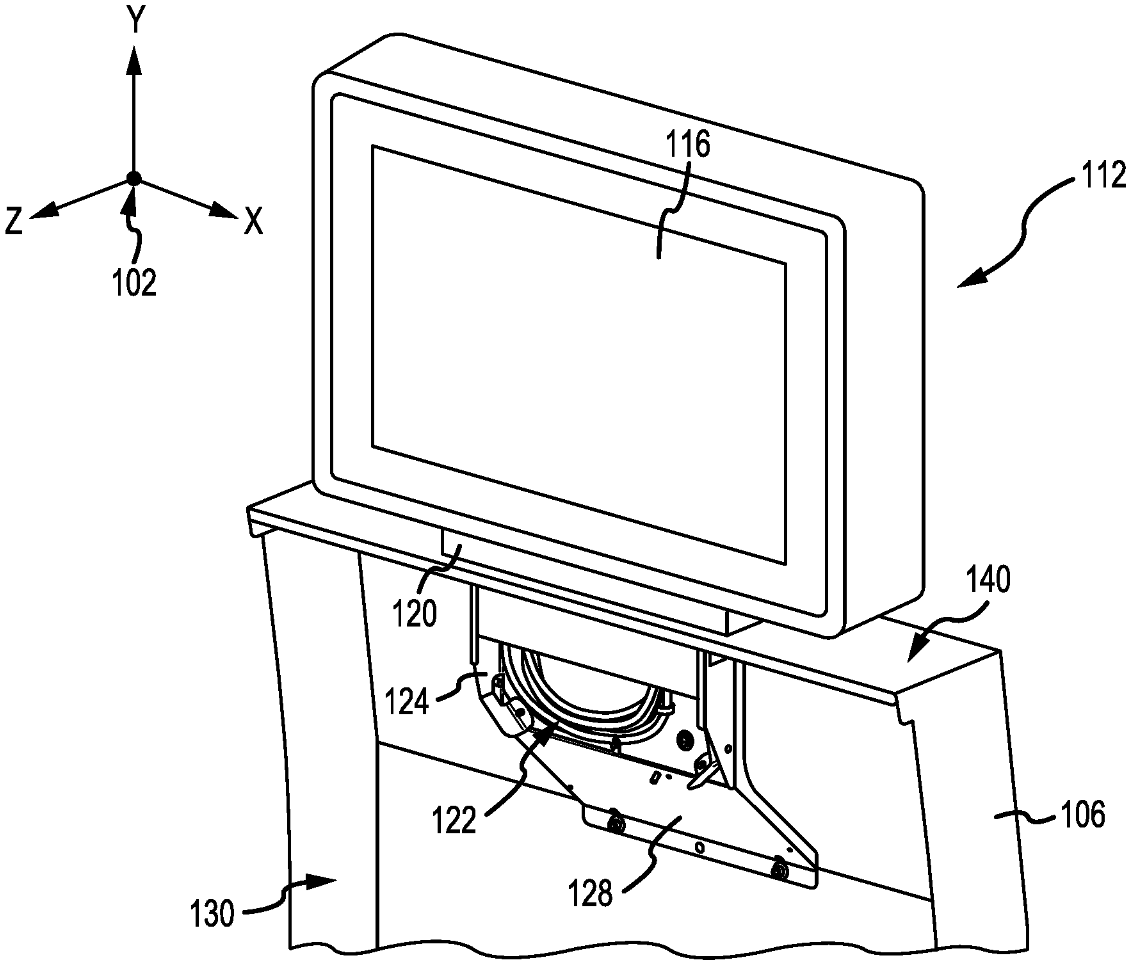
FIG. 1D is a detail perspective view of the top of a gaming machine with a display mount assembly attached to the gaming machine in accordance with embodiments of the present disclosure

Referring now to FIGS. 1C and 1D, detail perspective views of the top of a gaming machine 104 and display mount assembly 112 are shown. Specifically, in FIG. 1C the display mount assembly 112 is shown in a detached state and in FIG. 1D the display mount assembly 112 is shown in an attached state.

Prior to assembly, the display device 116 may be attached to the mount frame 124 via one or more fasteners, clamps, or interconnections. The cabling 122 of the display device 116 can be coiled, or otherwise contained, within an area of the mount frame 124. Among other things, this coiling and containment of the cabling 122 inside the mount frame 124 protects the cabling 122 prior to assembly, during engagement of the mount frame 124 with the receiver bracket 128, and/or during attachment and fastening of the mount frame 124 to the receiver bracket 128, etc. The coiling, or other arrangement of the cable, held together in the mount frame 124 may be referred to herein as a protected insertion loop. In some embodiments, the cabling 122 may include, but is in no way limited to, a power cable, a video information transfer cable, an audio information transfer cable, and/or one or more combination audio/video cables. For example, the cabling 122 may comprise a high-definition multimedia interface cable, a coaxial audio/video cable, digital video cable, analog signal cable, and/or other cables. In some embodiments, a display mount frame 120 may be attached to the mount frame 124 and/or the display device 116. The display mount frame 120 may provide a cover, protective shield, and/or mount for one or more portions of the display device 116 and the display mount assembly 112.

As described above, the receiver bracket 128 may be mounted to the cabinet 106 via one or more mounting fasteners 132 (e.g., nuts and washers, screws, etc.). In FIGS. 1C and 1D, the receiver bracket 128 is shown fastened to the interior rear surface of the cabinet 106 and to the top surface 140 of the cabinet 106 at first and second mount areas 144A, 144B. The receiver bracket 128 may be mounted using fasteners that may only be accessible from the interior compartment 130 of the cabinet 106. For instance, one or more tabs of the receiver bracket 128 may contact a surface opposite the top surface 140 (e.g., in the interior compartment 130) and fasteners may be tightened from inside the interior compartment 130 forcing the one or more tabs into contact with the surface. A tightened interface may maintain the receiver bracket 128 in a mounted state to the cabinet 106. When in the mounted state, the receiver bracket 128 may provide a mount aperture 136 that is sized to receive a portion of the mount frame 124.

In some embodiments, the fasteners described herein may comprise complementary screws and nuts, locking elements, protrusions and holes, pins and self-locking washers, threaded standoffs, etc., and/or combinations thereof. For example, portions of the cabinet 106 may be sheet metal comprising captured screws, standoffs, and/or captured nuts press-fit therein. Interfacing parts may comprise the corresponding and complementary features such as nuts, holes, and/or captured fasteners, respectively.

In one example, the interior of the cabinet 106 may include one or more threaded standoffs disposed (e.g., press-fit or interference-fit) in the surface opposite the top surface 140 (e.g., in the interior compartment 130). In this example, the receiver bracket 128 may include holes disposed in the one or more tabs that align with the one or threaded standoffs. The holes in the one or more tabs of the receiver bracket 128 may be aligned with the one or more threaded standoffs and when forced into contact with the cabinet 106 may be fastened via one or more nuts and washers. These holes may correspond to the tab mount holes 314 described in conjunction with FIGS. 3A-3C. Similar or opposite fastening arrangements may be used at any fastening or mount interface described herein.

During assembly of the display mount assembly 112 to the cabinet 106 of the gaming machine 104, the display mount assembly 112 is raised above the top surface 140 of the cabinet 106, as shown in FIG. 1C. In this position, the lower portion of the mount frame 124 is aligned with the mount aperture 136. Next, the display mount assembly 112 can be lowered, along the Y-axis, until the lower portion of the mount frame 124 is inserted into the mount aperture 136 and the display mount assembly 112 is supported by the receiver bracket 128 and the cabinet 106. It is an aspect of the present disclosure that the assembly can be completed by a single assembly technician safely without assistance from another.

In FIG. 1D, the display mount assembly 112 is shown attached to the cabinet 106 of the gaming machine 104. While in this attached state the display mount assembly 112 is prevented from falling off, or otherwise moving relative to, the gaming machine 104 by a number of interconnecting features, which will be described in greater detail with respect to the parts, assemblies, and states of FIGS. 2A-5B.

Figure 2A:
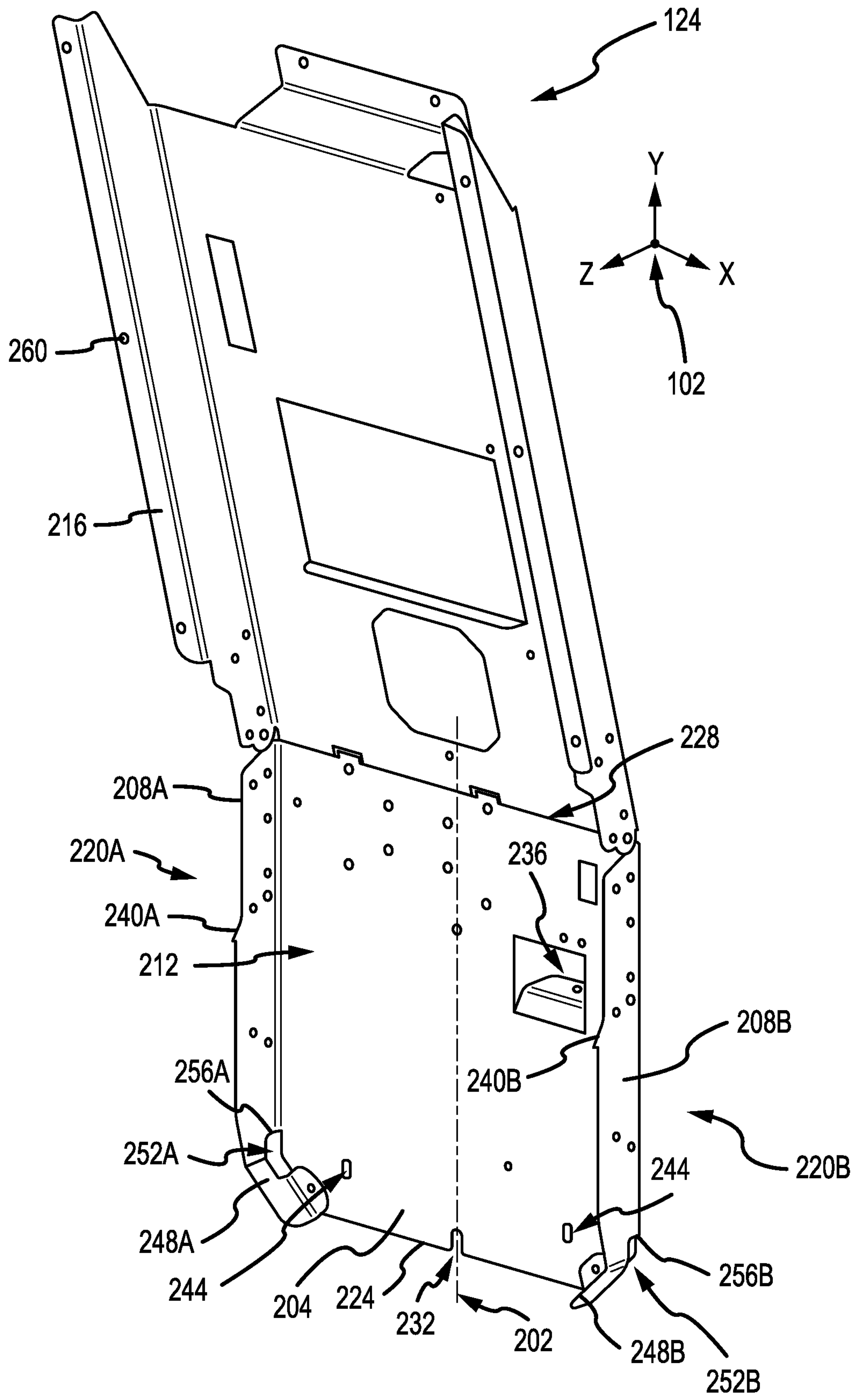
FIG. 2A is a perspective view of a mount frame of the gaming machine display device mount system in accordance with embodiments of the present disclosure.
Figure 2B:
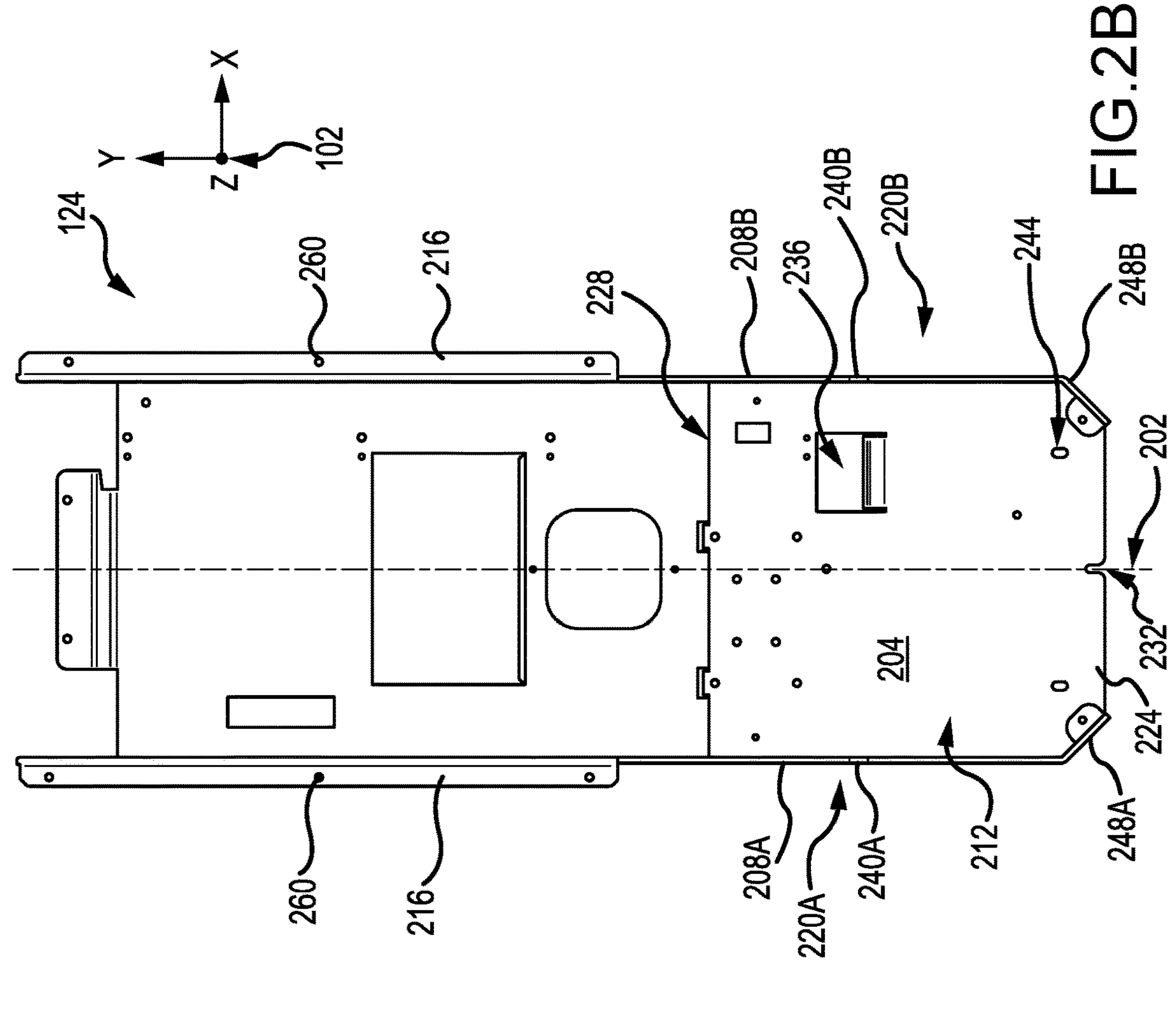
FIG. 2B is a front elevation view of the mount frame of the gaming machine display device mount system shown in FIG. 2A.
Figure 2C:
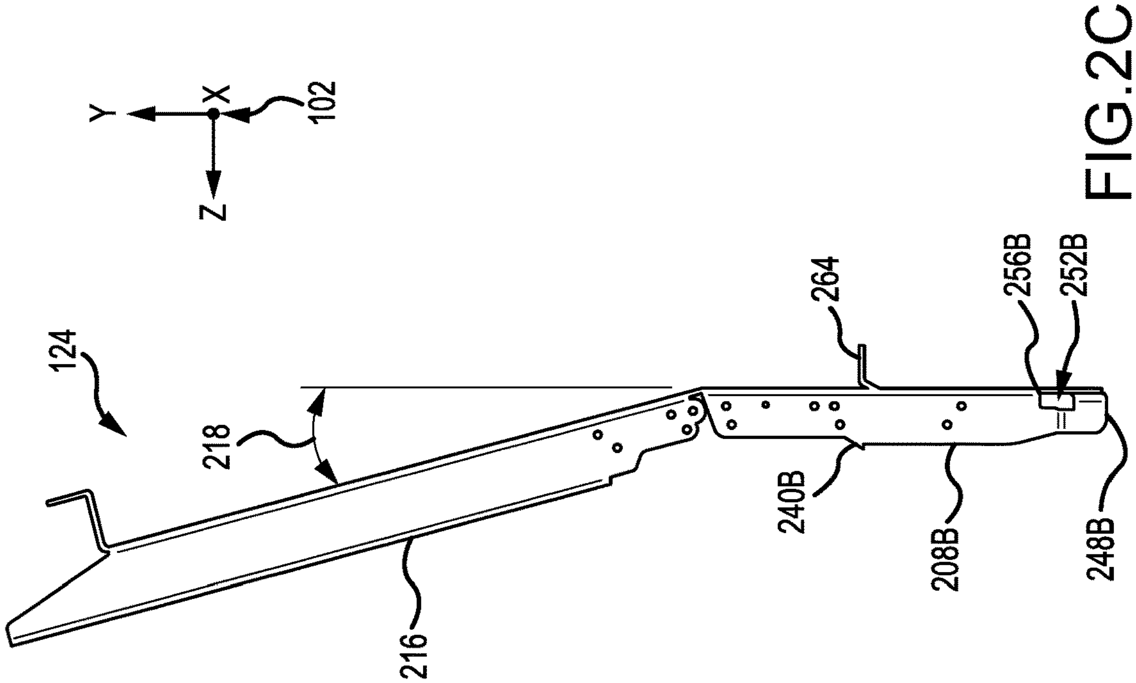
FIG. 2C is a side elevation view of the mount frame of the gaming machine display device mount system shown in FIGS. 2A and 2B.

FIGS. 2A-2C show various views of a mount frame 124 in accordance with embodiments of the present disclosure. The mount frame 124 may comprise a substantially planar mount body 204 extending a width and a height defining a first area. The width may extend from first side 220A of the mount frame 124 to a second side 220B of the mount frame 124. The height may extend from a lower edge 224 of the mount body 204 to an upper edge 228 of the mount body 204 of the mount frame 124. A pair of sidewalls 208A, 208B may be disposed at opposing edges of the width of the mount body 204. For instance, a first sidewall 208A may be disposed on a first side 220A of the mount frame 124 and a second sidewall 208B may be disposed on an opposite second side 220B of the mount frame 124. The pair of sidewalls 208A, 208B may extend a distance along the Z-axis in a direction away from the substantially planar mount body 204. In some embodiments, the pair of sidewalls 208A, 208B may correspond to bent portions of sheet metal of the mount frame 124.

A cable receiving space 212 may be defined between the pair of sidewalls 208A, 208B, the lower edge 224, the upper edge 228, and the substantially planar mount body 204. The cable receiving space 212 may be sized to receive and/or contain cabling 122 of a display device 116. In some embodiments, the mount body 204 may comprise one or more features (e.g., holes, clips, etc.) disposed in the cable receiving space 212 for holding the cabling 122 when coiled therein. In one embodiment, the mount body 204 may include a hole configured to receive a fastener and a clip. In some embodiments, the mount body 204 may comprise one or more tabs or holes to which a cable tie may be attached.

The mount frame 124 may comprise at least one cable routing cutout 236 disposed in the mount body 204 and/or other surface of the mount frame 124. The cable routing cutout 236 may be sized to pass at least a portion of the cabling 122 (e.g., a connector and a length of cable, etc.) through the mount body 204 of the mount frame 124 when attached to the receiver bracket 128. The cutout may comprise a cable routing tab 264 bent in a direction opposite the direction in which the pair of sidewalls 208A, 208B extend, as shown in FIG. 2C.

In some embodiments, the mount frame 124 may comprise one or more chamfered corners disposed at areas where the pair of sidewalls 208A, 208B meet the lower edge 224 of the mount body 204. The chamfered corners may be part of the pair of sidewalls 208A, 208B that are angled toward the center of the mount frame 124 (e.g., disposed along the centerline 202 of the mount frame 124). For instance, the first angled sidewall 248A may be disposed adjacent to the lower edge 224 of the mount body 204 and the first sidewall 208A. The second angled sidewall 248B may be disposed adjacent to the lower edge 224 of the mount body 204 and the second sidewall 208B. A portion of the first and/or second angled sidewalls 248A, 248B may contact the mount body 204 at a contact point. In one embodiment, the portion may be welded, adhered, interconnected, or otherwise fastened, to the mount body 204 at the contact point. The first and/or second angled sidewalls 248A, 248B may be angled at any angle providing a lead-in for the mount frame 124 to insert into the mount aperture 136 of the receiver bracket 128. For instance, these chamfered corners may be measured at 30 degrees, 45 degrees, 60 degrees and/or any other angle (e.g., an acute angle) relative to a respective sidewall in the pair of sidewalls 208A, 208B. The first and/or second angled sidewalls 248A, 248B may extend (e.g., along the Z-axis direction) from the contact point to an end point. The end point may be disposed an offset distance from the mount body 204 (e.g., as measured along the Z-axis). In any case, the chamfered corners may enable automatic alignment of the mount frame 124 in a position centered between the side rails of the receiver bracket 128 during insertion.

In one embodiment, the chamfered corners may include a cutout disposed between the mount body 204 and a depth of the angled sidewalls 248A, 248B. In one embodiment, the cutout may correspond to a first enclosed void of material 252A that is formed in the first angled sidewall 248A and the first sidewall 208A. The first enclosed void of material 252A may form a first ledge 256A in the first sidewall 208A, the first ledge 256A being disposed substantially perpendicular to both the first sidewall 208A and the mount body 204. Additionally or alternatively, a second enclosed void of material 252B may be formed in the second angled sidewall 248B and the second sidewall 208B. The second enclosed void of material 252B may form a second ledge 256B in the second sidewall 208B, the second ledge 256B being disposed substantially perpendicular to both the second sidewall 208B and the mount body 204. In some embodiments, the enclosed voids of material 252A, 252B may be sized to receive a pin, standoff, screw, or other protrusion in the receiver bracket 128. The protrusion may retain the mount frame 124 from rotating about the X-axis when attached to the receiver bracket 128 (e.g., before the mount frame 124 is fastened to the receiver bracket 128). In one embodiment, the ledge 256A, 256B in the first and/or second sidewall 208A, 208B of the mount frame 124 may rest on the protrusion in the receiver bracket 128 (e.g., when the mount frame 124 is attached to the receiver bracket 128).

In some embodiments, the mount frame 124 may comprise a display device mount surface 216 that is attached to the substantially planar mount body 204. In one embodiment, the display device mount surface 216 may correspond to a bent portion of the mount frame 124 that extends from the mount body 204. The display device mount surface 216 may be angled relative to the mount body 204. The angle of the display device mount surface 216 may define a viewing angle for the display device 116 attached thereto. The display device mount surface 216 may comprise one or more display device fastening elements 260. The display device fastening elements 260 may be used to mount the display device 116 to the display device mount surface 216. In some embodiments, the display device fastening elements 260 may correspond to holes, threaded holes, press-fit captured nuts, and/or standoffs, captured screws, etc.

The first sidewall 208A may comprise a first protrusion 240A disposed along a length of the first sidewall 208A. Additionally or alternatively, the second sidewall 208B may comprise a second protrusion 240B disposed along a length of the second sidewall 208B. In any case, the first protrusion 240A and/or the second protrusion 240B may extend a distance along the Z-axis in a direction away from the mount body 204. The first protrusion 240A and/or the second protrusion 240B may be configured to contact a portion of the receiver bracket 128 when assembled. The contact between the first and/or second protrusions 240A, 240B and the receiver bracket 128 may prevent movement of the mount frame 124 relative to the receiver bracket 128 in at least one direction. For instance, the contact may prevent movement of the mount frame 124 relative to the receiver bracket 128 along the Y-axis in a direction running from the upper edge 228 to the lower edge 224. Stated another way, the mount frame 124 may be restricted from moving further into the receiver bracket 128 and interior compartment 130 of the gaming machine 104 via the contact of the first and/or second protrusion 240A, 240B with the receiver bracket 128.

The mount frame 124 may comprise one or more slots 232, mount holes 244, and/or other cutouts. In one embodiment, the mount body 204 may comprise a lower slot 232 disposed in the lower edge 224 of the mount body 204. The lower slot 232 may correspond to a guidance slot for the mount frame 124 as the lower portion of the mount frame 124 is lowered into the mount aperture 136 of the receiver bracket 128. For example, a pin disposed in the receiver bracket 128 may engage with the lower slot 232 preventing rotation of the mount frame 124 about the Z-axis when attached to the receiver bracket 128. In some embodiments, the lower slot 232 may rest on the pin in the receiver bracket 128.

Referring to FIG. 2C, a side elevation view of the mount frame 124 of the gaming machine display device mount system 100 is shown in accordance with embodiments of the present disclosure. Although shown as side elevation view as seen from the second side 220B of the mount frame 124, it should be appreciated, that the side elevation view as seen from the first side 220A may be substantially, if not identically, symmetrical to the view shown in FIG. 2C. In some embodiments, the features of the mount frame 124 may be substantially symmetrical about the centerline 202. As provided above the display device mount surface 216 may be disposed at an angle relative to the mount body 204. This angle is highlighted as the display angle 218 in FIG. 2C. The display angle 218 may be predetermined to dispose the display device 116 at an angle relative to the gaming machine 104 when the display mount assembly 112 is attached to the gaming machine 104. Although shown as an acute angle, the display angle 218 may be set at any angle from, and including, 0 degrees to 90 degrees.

Figure 3A:
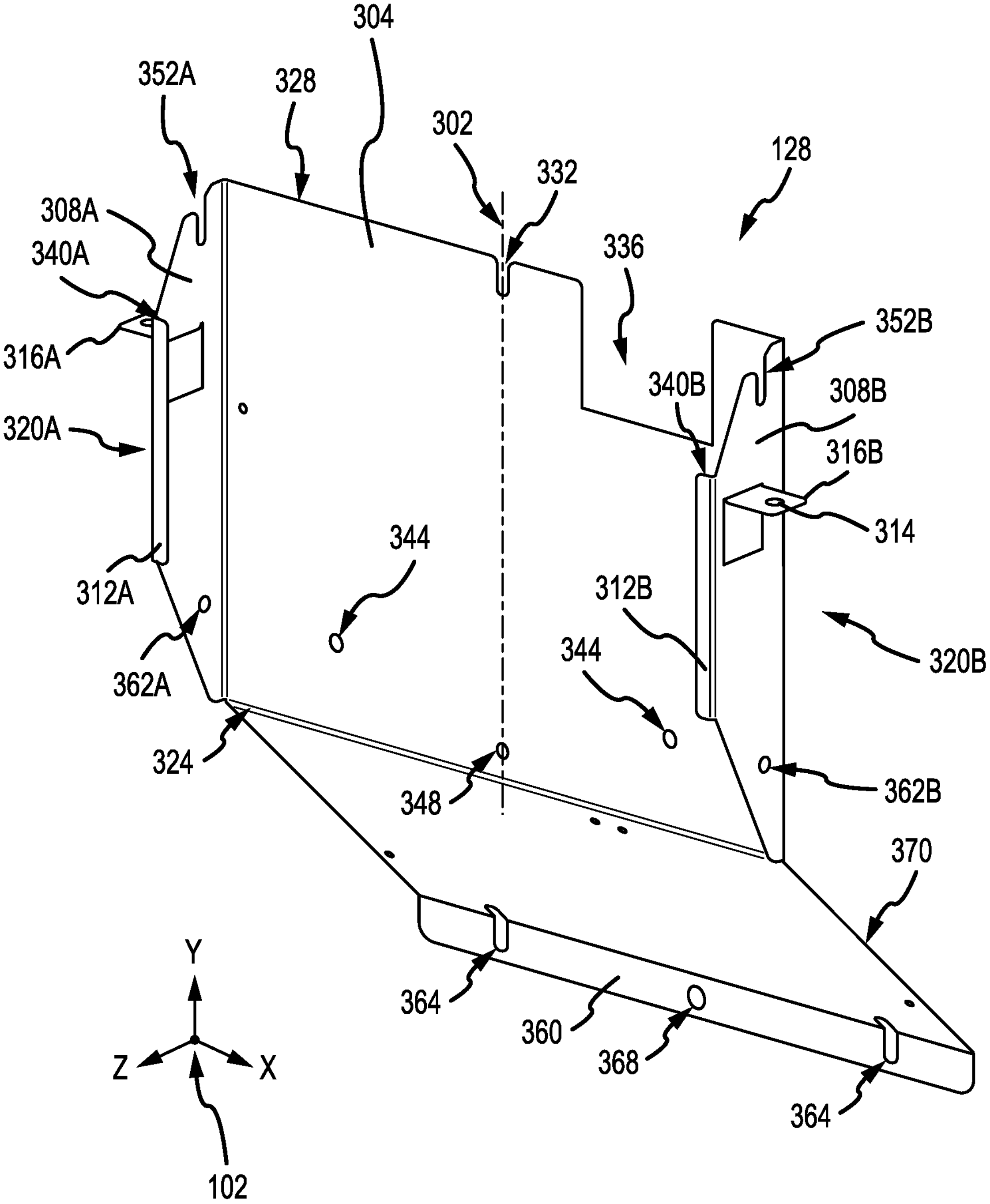
FIG. 3A is a perspective view of a receiver bracket of the gaming machine display device mount system in accordance with embodiments of the present disclosure.
Figure 3C:
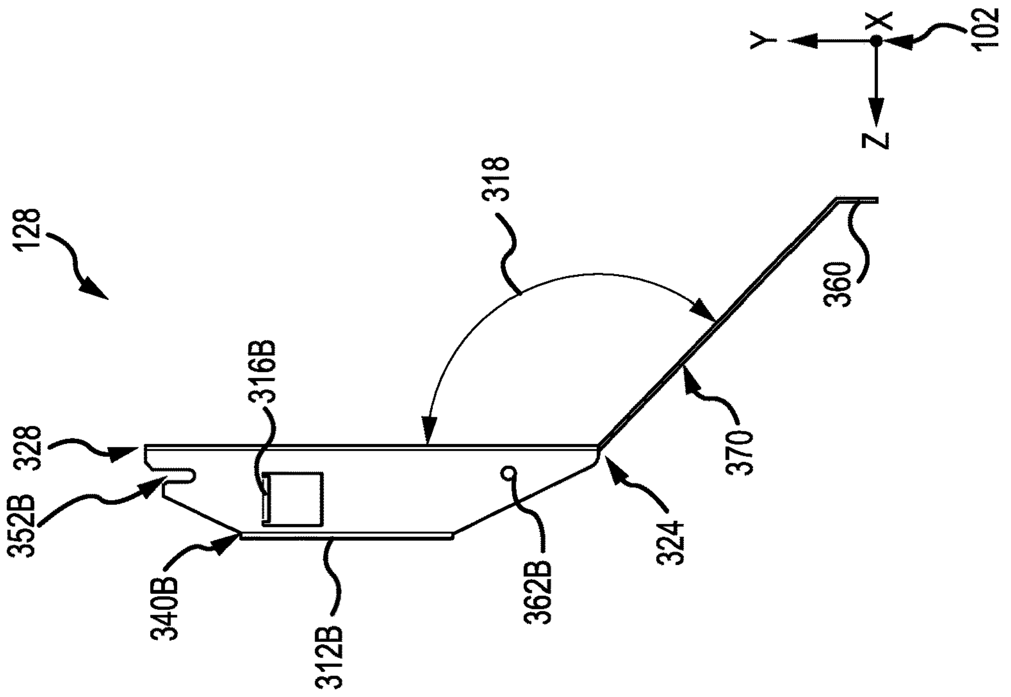
FIG. 3C is a side elevation view of the receiver bracket of the gaming machine display device mount system shown in FIGS. 3A and 3B.
Figure 3B:
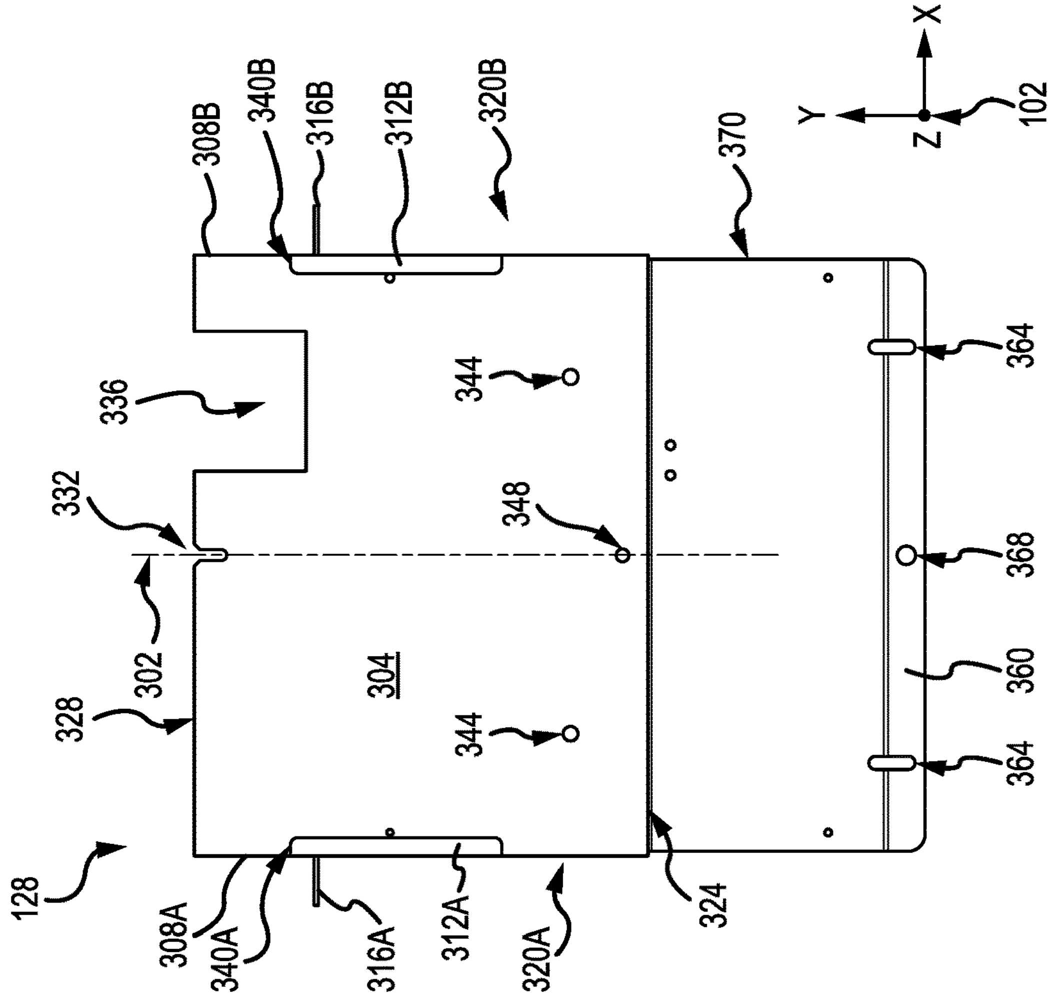
FIG. 3B is a front elevation view of the receiver bracket of the gaming machine display device mount system shown in FIG. 3A.

FIGS. 3A-3C show various views of a receiver bracket 128 of the gaming machine display device mount system 100 in accordance with embodiments of the present disclosure. The receiver bracket 128 may comprise a receiver body 304 comprising a first side 320A and a second side 320B. The receiver body 304 may comprise a width extending from the first side 320A to the second side 320B and a height extending from the lower receiver body edge 324 to the upper receiver body edge 328. In some embodiments, when the mount frame 124 is engaged with the receiver bracket 128, the mount body 204 of the mount frame 124 may slidably engage with the receiver body 304 of the receiver bracket 128. The receiver body 304 may be substantially planar across the width and height.

A first side rail 308A may be disposed on the first side 320A of the receiver body 304 and a second side rail 308B may be disposed on the second side 320B of the receiver body 304. The first and second side rails 308A, 308B may extend a distance along the Z-axis in a direction away from the receiver body 304. In one embodiment, the first side rail 308A may extend a first distance from the receiver body 304 and the second side rail 308B may extend a second distance from the receiver body 304. The first distance may be the same as, or different from, the second distance. In some embodiments, the first side rail 308A may comprise a first lip 312A extending a lip distance toward a center (e.g., toward a plane running through the centerline 302) of the receiver bracket 128. The second side rail 308B may comprise a second lip 312B extending a lip distance toward the center of the receiver bracket 128. The first lip 312A, first side rail 308A, receiver body 304, second side rail 308B, and the second lip 312B may define sides of the mount aperture 136 of the gaming machine display device mount system 100. Stated another way, these features of the receiver bracket 128 provide a channel for receiving the mount frame 124. For example, when the mount frame 124 is engaged with the receiver bracket 128, the pair of sidewalls 208A, 208B of the mount frame 124 may be retained by the first side rail 308A and the second side rail 308B of the receiver bracket 128. In some embodiments, the side rails 308A, 308B may retain the mount frame 124 without the lips 312A, 312B interfering with, or covering, the cabling 122 coiled in the cable receiving space 212 of the mount frame 124. Stated another way, the structure of the receiver bracket 128, utilizing rails 308A, 308B that are disposed on either side 320A, 320B of the receiver body 304 provide low-profile guides for the sides 220A, 220B of an engaging mount frame 124 to contact. Additionally or alternatively, the rails 308A, 308B are each connected to the receiver body 304 along one edge providing an open space in the front of the receiver bracket 128 to easily access any interfacing components (e.g., the mount frame 124, cabling 122, etc.). Among other things, this side rail design allows an assembly technician to access and route cabling 122 when the mount frame 124 of the display mount assembly 112 is engaged with the receiver bracket 128.

Each lip 312A, 312B may include a lip edge 340A, 340B disposed at an upper portion of the receiver bracket 128. The lip edges 340A, 340B may prevent movement of the mount frame 124 engaging with the receiver bracket 128 in the Y-axis. For instance, the one or more protrusions 240A, 240B disposed in the pair of sidewalls 208A, 208B may contact the lip edges 340A, 340B when the mount frame 124 is fully inserted into the mount aperture 136 of the receiver bracket 128 and is in an engaged state.

In some embodiments, the first side rail 308A may comprise a first cabinet fastening tab 316A and the second side rail 308B may comprise a second cabinet fastening tab 316B. The cabinet fastening tabs 316A, 316B may extend from an upper portion of the side rails 308A, 308B (e.g., closer to the upper receiver body edge 328 than the lower receiver body edge 324). The first cabinet fastening tab 316A may be disposed at a perpendicular angle to the first side rail 308A and extend in a direction away from the center of the receiver body 304. The second cabinet fastening tab 316B may be disposed at a perpendicular angle to the second side rail 308B and extend in a direction away from the center of the receiver body 304. In some embodiments, the cabinet fastening tabs 316A, 316B may be disposed substantially perpendicular to the side rails 308A, 308B and the receiver body 304 of the receiver bracket 128. Each of the cabinet fastening tabs 316A, 316B may include one or more tab mount holes 314 disposed therein. As described above, the tab mount holes 314 may be aligned with corresponding features (e.g., standoffs, screws, etc.) disposed in the cabinet 106 to mount the receiver bracket 128 to the inside surface of the gaming machine 104 (e.g., opposite the top surface 140). Because the fastening elements (e.g., nuts, self-locking washers, etc.) can be disposed inside the interior compartment 130 of the gaming machine 104, there is no need to expose fastening elements to the exterior space 110 of the gaming machine 104. Among other things, this arrangement of elements provides a clean and smooth gaming machine 104 exterior surface.

As provided above, one or more of the side rails 308A, 308B may include a pin mount 362A, 362B. For instance, the first side rail 308A may include a first pin mount 362A and, in some cases, the second side rail 308B may include a second pin mount 362B. Each pin mount 362A, 362B may correspond to a hole disposed in a respective side rail 308A, 308B. In one embodiment, a pin or standoff may be press-fit, or interference-fit, into one or more of the pin mounts 362A, 362B. The pins may be disposed in a respective side rail 308A, 308B such that the pins extend toward a center of the receiver bracket 128 (e.g., toward a plane running through the centerline 302). The pins may align with the first and second enclosed voids of material 252A, 252B in an engaging mount frame 124. In some embodiments, the pins may contact the mount frame 124 at an edge or periphery of the first and/or second enclosed voids of material 252A, 252B, a surface of the mount body 204, and/or the first and/or second ledges 256A, 256B of the mount frame 124.

The receiver bracket 128 may comprise a number of additional holes (e.g., mount frame fastening holes 344, center pin hole 348, center location hole 368, cabinet mount hole 364, etc.) and/or slots (e.g., upper receiver body slot 332, first side rail slot 352A, second side rail slot 352B, etc.), which may aid in fastening or retaining an engaged and attached mount frame 124 to the receiver bracket 128. For instance, the mount frame fastening holes 344 may comprise a threaded hole or a hole with a captured nut pressed therein. The mount frame fastening holes 344 may correspond to mating holes of the mount holes 244 disposed in the lower portion of the mount frame 124. When the mount frame 124 is engaged with the receiver bracket 128 and installed in a position where at least one of the protrusions 240A, 240B contact a lip edge 340A, 340B of the receiver bracket 128, the mount holes 244 in the mount frame 124 align with the mount frame fastening holes 344 in the receiver bracket 128. From this position, an assembly technician may fasten the mount frame 124 to the receiver bracket 128 by inserting screws through the mount holes 244 and then engaging the threads of the screws with the threads of the mount frame fastening holes 344.

The center pin hole 348 may correspond to hole that is sized to receive a pin or standoff. In one embodiment, a pin or standoff may be press-fit, or interference-fit, into the center pin hole 348 extending in a direction away from the receiver body 304. The pin disposed in the center pin hole 348 may serve to locate and/or support the mount frame 124 engaged with the receiver bracket 128. For instance, the pin may engage with the lower slot 232 of the mount frame 124. As can be appreciated, the pin in the center pin hole 348 and the side rails 308A, 308B may prevent rotation of the mount frame 124 and the display mount assembly 112 about the Z-axis (e.g., rotating in the XY-plane).

The receiver bracket 128 may comprise a cabinet mount flange 360 that is disposed behind the receiver body 304 and lower than the lower receiver body edge 324. In some embodiments, the cabinet mount flange 360 may be attached to the receiver body 304 via a web 370 or transition material. In one embodiment, the receiver body 304, the web 370, and the cabinet mount flange 360 may be bent from a single piece of sheet metal. In addition to the cabinet fastening tabs 316A, 316B, the receiver bracket 128 may be attached to the interior compartment 130 of the cabinet 106 at the cabinet mount flange 360. For example, the cabinet mount flange 360 may comprise a plurality of cabinet mount holes 364 and a center location hole 368 disposed in the lowermost portion of the receiver bracket 128. The holes may be configured as slotted holes, circular holes, oversized holes, or any other void of material that passes through the cabinet mount flange 360. As provided above, the holes 364, 368 may align with corresponding standoffs, pins, screws, bolts, threaded rods, threaded holes, captured nuts, etc., disposed in the interior compartment 130 of the cabinet 106. In some embodiments, a screw may be inserted through one or more of the holes 364, 368 and engaged with the corresponding threaded holes in the cabinet 106, fastening the lowermost portion of the receiver bracket 128 to the cabinet 106.

In some embodiments, the receiver bracket 128 may include slots 352A, 352B disposed in the side rails 308A, 308B. These slots 352A, 352B may be disposed in an upper portion of the receiver bracket 128 and may be sized to engage with pins extending outwardly from the pair of sidewalls 208A, 208B (e.g., away from the center of the mount frame 124). The slots 352A, 352B may provide a positive location and retaining feature for the mount frame 124 by supporting a portion of the mount frame 124 and the display mount assembly 112 adjacent to the top surface 140 of the cabinet 106. The first side rail slot 352A may be disposed in the first side rail 308A and the second side rail slot 352B may be disposed in the second side rail 308B. Similarly, the receiver body 304 may comprise an upper receiver body slot 332 that may engage with a pin disposed in the mount frame 124 and further prevent rotation of the display mount assembly 112 and the mount frame 124 about the Z-axis.

A cable routing notch 336 may be disposed in the receiver body 304 at an upper portion thereof. In one embodiment, the cable routing notch 336 may extend from the upper receiver body edge 328 into the receiver body 304 (e.g., in a direction toward the lower receiver body edge 324). The cable routing notch 336 may be aligned with the cable routing cutout 236 of the mount frame 124 when engaged with and attached to the receiver bracket 128. Among other things, this cable routing notch 336 provides a routing access port from the mount frame 124 through the receiver bracket 128 and into the interior compartment 130 between the rearmost panel of the cabinet 106 and the receiver bracket 128.

As shown in FIG. 3C, the web 370 may be disposed at an angle (e.g., web angle 318) relative to the surface of the receiver body 304. Although shown as an obtuse angle, the web angle 318 may be set at any angle between, and including, 90 degrees to 170 degrees. In one embodiment, the web angle 318 may be 135 degrees. The cabinet mount flange 360 may be set to be parallel, or substantially parallel, to the receiver body 304 and/or the rear surface of the interior compartment 130 of the cabinet 106.

Figure 4:
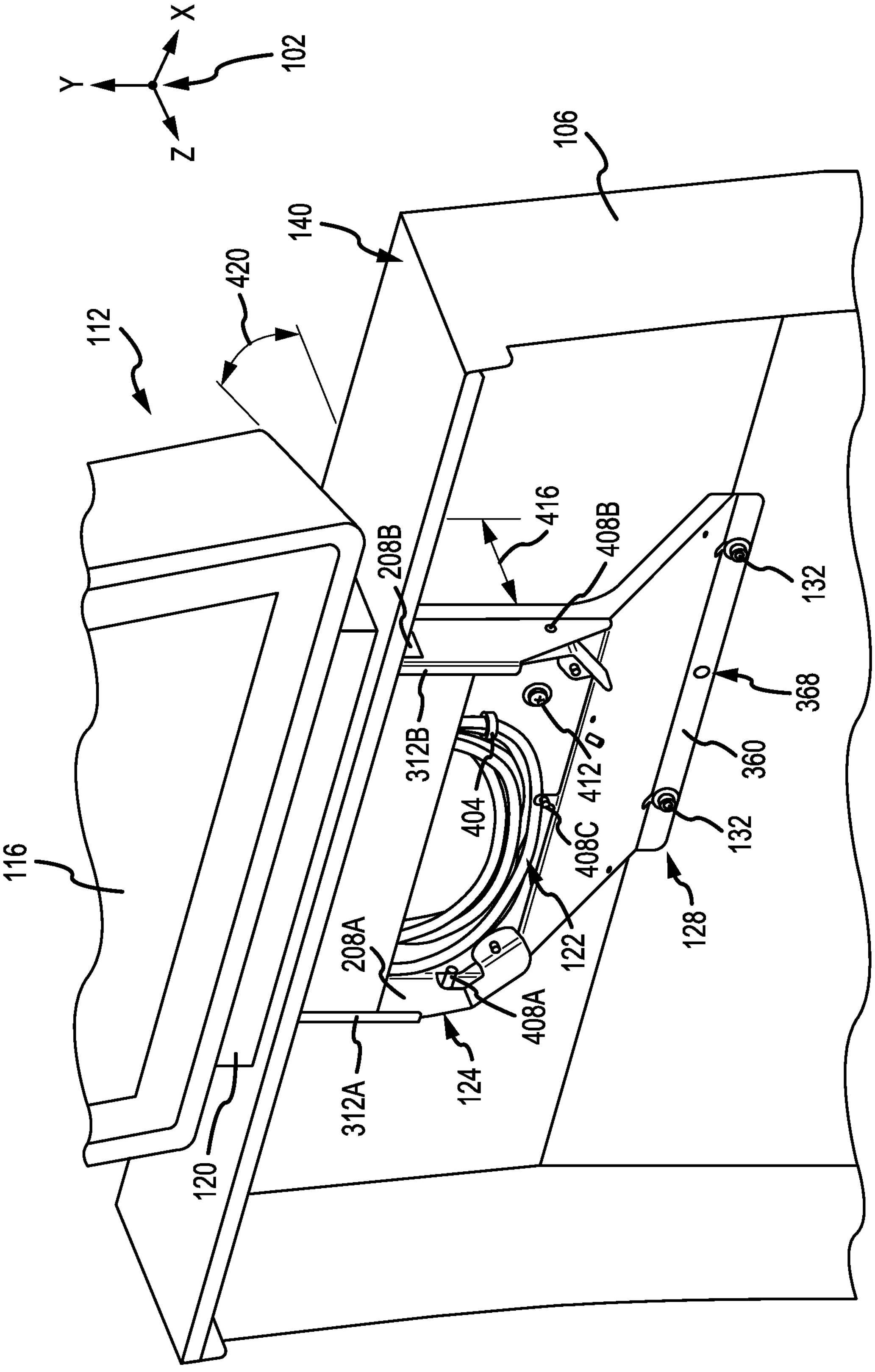
FIG. 4 is a detail perspective view of the top of a gaming machine with a display mount assembly attached to the gaming machine in accordance with embodiments of the present disclosure.

FIG. 4 shows a detail perspective view of the top of a gaming machine 104 with a display mount assembly 112 including a mount frame 124 attached to the receiver bracket 128 inside the interior compartment 130. In particular, FIG. 4 shows the mount frame 124 of the display mount assembly 112 attached and fastened to the receiver bracket 128. As described above, the display mount assembly 112 may comprise a display device 116 and associated cabling 122 attached in a pre-assembly coiled state to the mount frame 124. More specifically, the cabling 122 may be coiled in the cable receiving space 212 of the mount frame 124. The cabling 122 may be disposed completely within the bounds of the mount body 204 in this pre-assembly state. In some embodiments, the cabling 122 may be held in place by a cable tie 404 that is fastened, or otherwise attached, to the mount frame 124. This arrangement, among other things, allows the mount frame 124 to be engaged with the receiver bracket 128 without loose cabling 122 interfering with assembly.

In FIG. 4, the first sidewall 208A of the mount frame 124 is shown in a retained position behind the first lip 312A of the receiver bracket 128. Similarly, the second sidewall 208B of the mount frame 124 is shown in a retained position behind the second lip 312B of the receiver bracket 128. In some embodiments, the first retaining pin 408A shown disposed in the first pin mount 362A of the receiver bracket 128 extends toward a center plane of the receiver bracket 128. The second retaining pin 408B is disposed in the second pin mount 362B and extending toward the center plane of the receiver bracket 128 from the opposite side of the receiver bracket 128. The retaining pins 408A, 408B may engage with enclosed voids of material 252A, 252B (e.g., without contacting the mount frame 124) and when the mount frame 124 is fully-inserted into the receiver bracket 128, the retaining pins 408A, 408B may contact the pair of sidewalls 208A, 208B, the mount body 204, and/or the first and/or second ledges 256A, 256B. A center mount frame location pin 408C is shown extending from the receiver body 304 a distance along the Z-axis and engaging with the lower slot 232 of the mount frame 124.

As illustrated in FIG. 4, the mount frame 124 is fastened to the receiver bracket 128 via one or more mount frame fasteners 412. The mount frame fasteners 412 may engage with the mount holes 244 and the mount frame fastening holes 344 of the mount frame 124 and the receiver bracket 128, respectively. Once fastened via the mount frame fasteners 412 from the interior compartment 130 of the cabinet 106, the display mount assembly 112 cannot be removed from the receiver bracket 128 and/or the gaming machine 104 from an exterior space 110 of the gaming machine 104. In some embodiments, the gaming interface panel 108 may be locked to the cabinet 106 securely separating the interior compartment 130 from the exterior space 110. Only authorized technicians or service personnel who have keyed access to the interior compartment 130 of the gaming machine 104 can attach or detach the display mount assembly 112 to the gaming machine 104. Stated another way, without authorized access to the interior compartment 130, the display mount assembly 112 cannot be removed from the gaming machine 104.

The receiver bracket 128 may provide an offset distance 416 from the rear surface of the receiver body 304 to the rear interior surface of the cabinet 106. Among other things, this offset distance 416 provides space through which the cabling 122 may be uncoiled and routed after the mount frame 124 has been fastened to the receiver bracket 128. Additionally or alternatively, the offset distance 416 may provide room inside the cabinet 106 for gaming mechanisms, processors, memory, wiring, and/or other components. The receiver bracket 128 is attached to the cabinet 106 via the mounting fasteners 132 (e.g., nuts and washers fastened to threaded standoffs, etc.) at the cabinet mount flange 360 and to the top portion of the cabinet 106 via fasteners engaging the cabinet fastening tabs 316A, 316B and the tab mount holes 314 to the interior surface of the cabinet 106 opposite the top surface 140.

The display device 116 may be disposed at an angle relative to a player of the gaming machine 104 via the display frame tilt angle 420. The display frame tilt angle 420 may correspond to the display angle 218 of the mount frame 124. In some embodiments, the display frame tilt angle 420 may orient the display device 116 to face a player when the player is facing the front of the gaming machine 104. The display frame tilt angle 420 may be an acute angle, but is not so limited. For instance, the display frame tilt angle 420 may be any angle between, and including 0 degrees to 90 degrees. In some embodiments, the display frame tilt angle 420 may be between, and including 5 degrees to 15 degrees.

Figure 5A:
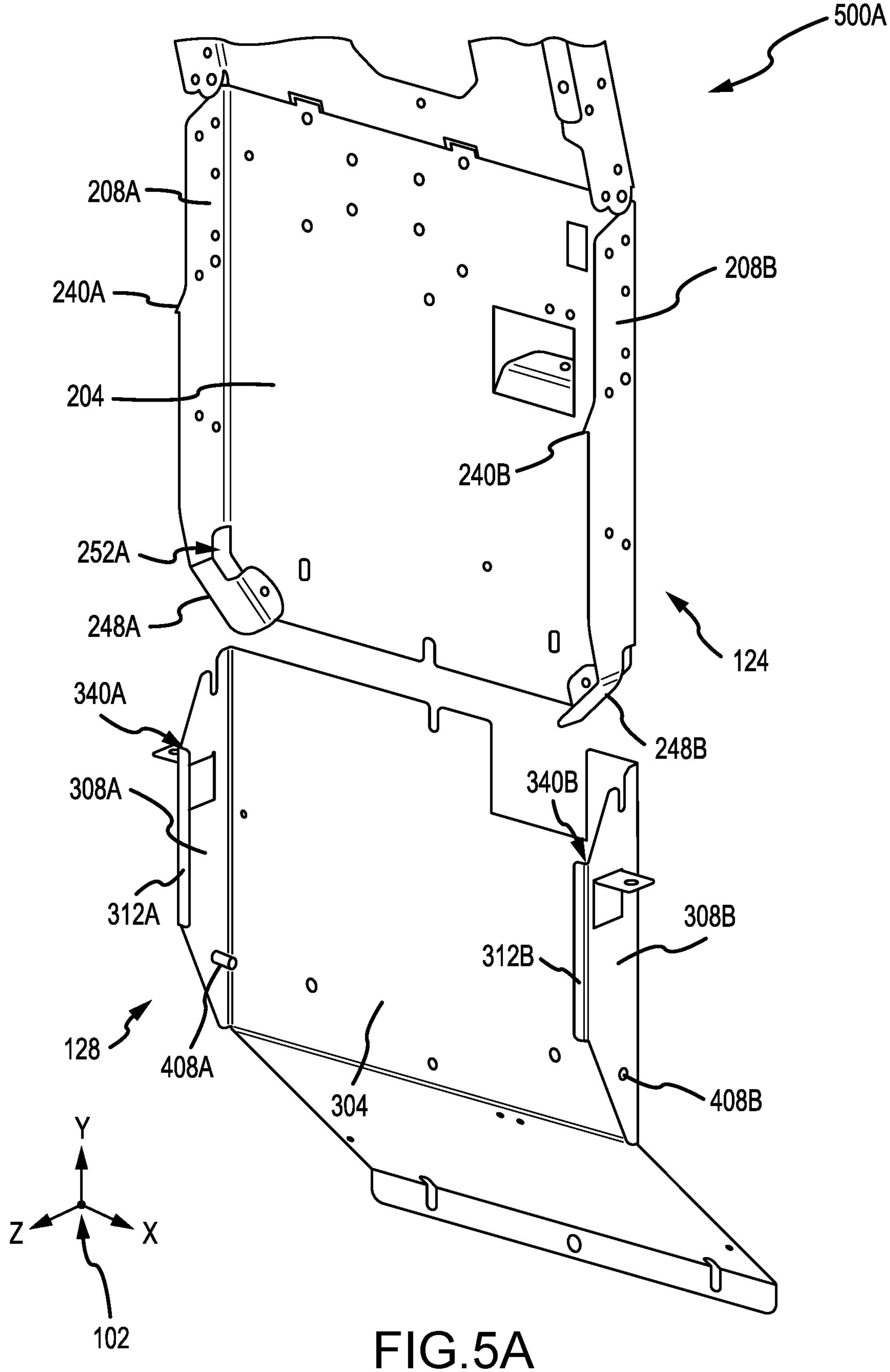
FIG. 5A is a schematic detail perspective view of the mount frame and the receiver bracket of the gaming machine display device mount system separated from one another in accordance with embodiments of the present disclosure.
Figure 5B:
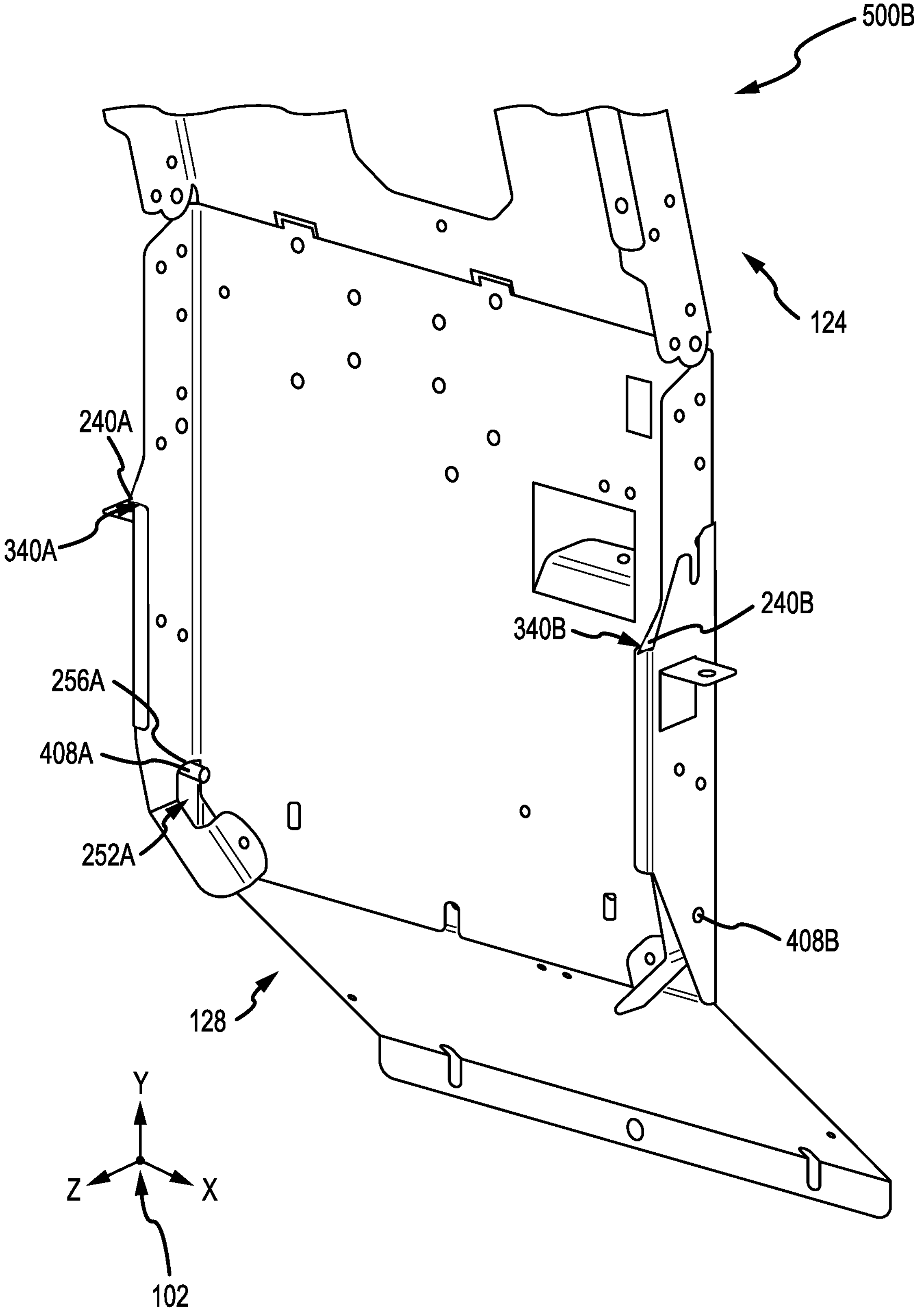
FIG. 5B is a schematic detail perspective view of the mount frame and the receiver bracket of the gaming machine display device mount system interconnected with one another in accordance with embodiments of the present disclosure.

FIGS. 5A-5B show schematic detail perspective views of the mount frame 124 and the receiver bracket 128 of the gaming machine display device mount system 100 in a detached state 500A and an attached state 500B, respectively. In particular, most of the components of the gaming machine 104 and the display mount assembly 112 have been removed in the schematic views of FIGS. 5A-5B for the sake of clarity in describing the interface between the components during assembly.

In FIG. 5A, the mount frame 124 is positioned above the receiver bracket 128 prior to assembly. In the detached state 500A, an assembly technician may align the pair of sidewalls 208A, 208B in between the side rails 308A, 308B of the receiver bracket 128. In addition, the assembly technician aligns the rear surface of the mount body 204 with the front surface of the receiver body 304. The pair of sidewalls 208A, 208B of the mount frame 124 are sized to fit in the space between the receiver body 304 and the lips 312A, 312B. The receiver body 304, the first side rail 308A, and the first lip 312A form a first channel that receives the first sidewall 208A of the mount frame 124. The receiver body 304, the second side rail 308B, and the second lip 312B form a second channel that receives the second sidewall 208B of the mount frame 124. Once aligned, the assembly technician may move the mount frame 124 in a direction (e.g., along the Y-axis) toward the receiver bracket 128 until the pair of sidewalls 208A, 208B engage with the first and second channels of the receiver bracket 128.

As the assembly technician slides the mount frame 124 inside the first and second channels of the receiver bracket 128, the first retaining pin 408A may engage with the first enclosed void of material 252A and the second retaining pin 408B may engage with the second enclosed void of material 252B. When the first protrusion 240A and/or the second protrusion 240B contacts the first lip edge 340A and/or the second lip edge 340B, respectively, the mount frame 124 is in the attached position and attached state 500B.

In FIG. 5B, the mount frame 124 is retained in the attached state 500B by a number of features of the receiver bracket 128. For instance, the lips 312A, 312B, retain the pair of sidewalls 208A, 208B and prevent movement of the mount frame 124 along the X-axis and/or along the Z-axis. The first lip edge 340A and/or the second lip edge 340B prevent movement of the mount frame 124 along the negative Y-axis direction. Additionally or alternatively, the first retaining pin 408A, the second retaining pin 408B, and/or other interactions between pins and holes or slots (not shown in this view) may provide support, retaining capabilities, and/or safety locking of the mount frame 124 relative to the receiver bracket 128 before the mount frame 124 is fastened to the receiver bracket 128. Once the mount frame 124 is engaged with the receiver bracket 128 in the attached state 500B, the mount frame 124 may be affixed, or otherwise, fastened to the receiver bracket 128 via mount frame fasteners 412.

As should be appreciated by one skilled in the art, aspects of the present disclosure have been illustrated and described herein in any of a number of patentable classes or context including any new and useful process, machine, manufacture, or composition of matter, or any new and useful improvement thereof.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

What is claimed is:

1. A display mounting system, comprising:

a mount frame, comprising:

a substantially planar body extending a width and a height, the width and the height defining a first surface area;

a pair of sidewalls joined to the substantially planar body and running a distance along the height of the substantially planar body, the pair of sidewalls comprising a first sidewall and a second sidewall disposed at opposing edges of the width of the substantially planar body, each of the pair of sidewalls protruding a distance in a depth direction away from the substantially planar body in a space between an upper edge and a lower edge of the substantially planar body;

a cable receiving space disposed between the pair of sidewalls and within the first surface area of the substantially planar body; and a display device mount surface attached to the upper width edge of the substantially planar body and extending in an angled direction away from the upper width edge and away from the substantially planar body; and a receiver bracket, comprising:

a body comprising a first side and a second side;

a first side rail disposed on the first side of the body and extending from the body a first distance in the depth direction, the first side rail comprising a first lip extending a lip distance toward a center of the body; and a second side rail disposed on the second side of the body and extending from the body in the depth direction, the second side rail comprising a second lip extending toward the center of the body, wherein at least a portion of the mount frame is engageable with the receiver bracket between a detached state and an attached state, wherein the detached state comprises a physical distance separating the mount frame from the receiver bracket, wherein the attached state comprises a physical contact of the mount frame with the receiver bracket, and wherein, in the attached state, the pair of sidewalls are retained by the first and second side rails of the receiver bracket and the first surface area is disposed between first and second side rails of the receiver bracket.

2. The display mounting system of claim 1, further comprising:

a display device attached to the display device mount surface of the mount frame, wherein, in the attached state, cabling of the display device is coiled and secured completely within the cable receiving space.

3. The display mounting system of claim 2, wherein the at least a portion of the mount frame is further engageable with the receiver bracket in an affixed state where at least one fastener affixes the mount frame to the receiver bracket, and wherein, in the affixed state, the cabling of the display device is substantially uncoiled and routed through a cutout disposed in the substantially planar body and routed through a notch disposed in the body of the receiver bracket.

4. The display mounting system of claim 1, wherein the mount frame further comprises a protrusion disposed along a length of a first sidewall of the pair of sidewalls, the protrusion extending in the depth direction away from the substantially planar body, and wherein, in the attached state, the protrusion contacts the first lip of the first side rail preventing movement of the mount frame relative to the receiver bracket in at least one direction.

5. The display mounting system of claim 1, wherein the receiver bracket comprises a cabinet fastening tab extending from an upper portion of the first side rail in a direction away from the center of the body, the cabinet fastening tab being disposed substantially perpendicular to both the first side rail and the body.

6. The display mounting system of claim 1, wherein the mount frame further comprises:

a chamfered corner comprising an angled sidewall extending in the depth direction from a contact point with the substantially planar body and an end point disposed an offset distance from the substantially planar body, the chamfered corner being adjacent to the lower edge of the substantially planar body and the first sidewall of the pair of sidewalls.

7. The display mounting system of claim 6, wherein an enclosed void of material is formed in the angled sidewall and the first sidewall, the enclosed void of material forming a ledge in the first sidewall, the ledge being disposed substantially perpendicular to both the first sidewall and the substantially planar body.

8. The display mounting system of claim 7, wherein the receiver bracket comprises a protrusion extending from a lower portion of the first side rail toward the center of the body, and wherein, in the attached state, the protrusion is disposed in the enclosed void of material, and in contact with at least one of the substantially planar body, the first sidewall, and the ledge of the mount frame.

9. The display mounting system of claim 8, wherein the display device mount surface comprises fastening elements that interconnect with and retain a display device to the mount frame.

10. The display mounting system of claim 9, wherein at least one of the mount frame and the receiver bracket is formed from sheet metal.

11. A display mount frame system, comprising:
- a display mount frame, comprising:
  - a plate comprising an area defined by a width running from a first side to a second side of the plate and a height running from an upper edge to a lower edge of the plate;
  - a first sidewall joined to the plate and running a first length along the height of the plate, the first sidewall extending a first distance from the first side of the plate in a depth direction, wherein the first sidewall is disposed substantially perpendicular to the plate;
  - a second sidewall joined to the plate and running a second length along the height of the plate, the second sidewall extending a second distance from the second side of the plate in the depth direction, wherein the second sidewall is disposed substantially perpendicular to the plate;
  - an angled cutout of material disposed at opposing corners of the lower edge of the plate;
  - an angled portion of the first sidewall bent inwardly toward a center of the plate and affixed to the plate adjacent a first corner of the opposing corners of the lower edge of the plate;
  - an angled portion of the second sidewall bent inwardly toward the center of the plate and affixed to the plate adjacent a second corner of the opposing corners of the lower edge; and
  - a display device mount surface attached to the upper edge of the plate and extending in an angled direction away from the upper edge and away from the plate; and
- a display device fastened to the display device mount surface, the display device, comprising:
  - a display screen that, when energized, renders images to pixels of the display screen; and
  - cabling electrically interconnected to the display screen, the cabling comprising at least one of a power cable, a video information transfer cable, and an audio information transfer cable, wherein the cabling is coiled into a protected insertion loop in the display mount frame within the area of the plate and protected on at least three sides by material of the display mount frame running from the first sidewall, to the plate, and then to the second sidewall.

12. The display mount frame system of claim 11, wherein the protected insertion loop is retained to the plate in a coiled arrangement via a removable fastening element.

13. The display mount frame system of claim 12, wherein the display mount frame further comprises a protrusion disposed along an edge of the first sidewall, the protrusion extending a distance from the edge of the first sidewall, the protrusion being located at a point along a length of the first sidewall between the upper edge and the lower edge of the plate.

14. The display mount frame system of claim 13, wherein an enclosed void of material is formed in the angled portion of the first sidewall and the first sidewall, the enclosed void of material forming a pin receiving slot in the first sidewall.

15. The display mount frame system of claim 14, wherein the display mount frame is integrally formed from sheet metal, wherein the display device mount surface is bent at an angle relative to a planar surface of the plate, wherein the plate further comprises a cutout that extends through the plate, and wherein the cutout is sized to receive the cabling of the display device when the removable fastening element is released from the cabling and the cabling is uncoiled from the protected insertion loop.

16. A gaming machine, comprising:
- a cabinet separating an interior space of the gaming machine from an exterior of the gaming machine;
- a receiver bracket attached to the cabinet from the interior space and providing an opening from the exterior of the gaming machine to the interior space of the gaming machine, the receiver bracket, comprising:
  - a body comprising a first side and a second side, wherein a portion of the body is disposed in the interior space of the gaming machine;
  - a first side rail disposed on the first side of the body and extending from the body in a depth direction away from the body, the first side rail comprising a first lip extending a lip distance toward a center of the body; and
  - a second side rail disposed on the second side and extending from the body in the depth direction, the second side rail comprising a second lip extending toward the center of the body;
- a display mount frame, comprising:
  - a substantially planar body extending a width and a height, the width and the height defining a first surface area;
  - a pair of sidewalls joined to the substantially planar body and running a distance along the height of the substantially planar body, the pair of sidewalls comprising a first sidewall and a second sidewall disposed at opposing edges of the width of the substantially planar body, each of the pair of sidewalls protruding a distance in the depth direction away from the substantially planar body in a space between an upper edge and a lower edge of the substantially planar body;
  - a cable receiving space disposed between the pair of sidewalls and within the first surface area of the substantially planar body; and
  - a display device mount surface attached to the upper width edge of the substantially planar body and extending in an angled direction away from the upper width edge and away from the substantially planar body; and
- a display device attached to the display device mount surface of the display mount frame, wherein the display mount frame is engageable with the receiver bracket between a detached state and an attached state, wherein the detached state comprises a physical distance separating the display mount frame and the display device from the receiver bracket and the gaming machine, wherein the attached state comprises a contact of the display mount frame with the receiver bracket, wherein, in the attached state, the pair of sidewalls are retained by the first and second side rails of the receiver bracket, the first surface area is disposed between first and second side rails of the receiver bracket, and cabling of the display device is coiled and secured completely within the cable receiving space.

17. The gaming machine of claim 16, wherein the display mount frame is further engageable with the receiver bracket in an affixed state where at least one fastener affixes the display mount frame to the receiver bracket, and wherein, in the affixed state, the cabling of the display device is substantially uncoiled and routed through a cutout disposed in the substantially planar body and routed through a notch disposed in the body of the receiver bracket.

18. The gaming machine of claim 16, wherein the display mount frame further comprises a protrusion disposed along a length of a first sidewall of the pair of sidewalls, the protrusion extending in the depth direction away from the substantially planar body, and wherein, in the attached state, the protrusion contacts the first lip of the first side rail preventing movement of the display mount frame relative to the receiver bracket and the gaming machine in at least one direction.

19. The gaming machine of claim 18, wherein the receiver bracket comprises a cabinet fastening tab extending from an upper portion of the first side rail away from the center of the body, the cabinet fastening tab disposed substantially perpendicular to both the first side rail and the body, and wherein the receiver bracket is attached to the cabinet via a fastener inserted through the cabinet fastening tab and into the cabinet inside the interior space of the gaming machine.

20. The gaming machine of claim 19, wherein the display mount frame further comprises:

a chamfered corner comprising an angled sidewall extending in the depth direction from a contact point with the substantially planar body and an end point disposed an offset distance from the substantially planar body, the chamfered corner adjacent to the lower edge of the substantially planar body and the first sidewall of the pair of sidewalls, wherein an enclosed void of material is formed in the angled sidewall and the first sidewall, the enclosed void of material forming a ledge in the first sidewall, the ledge disposed substantially perpendicular to both the first sidewall and the substantially planar body, wherein the receiver bracket comprises a protrusion extending from a lower portion of the first side rail toward the center of the body, and wherein, in the attached state, the protrusion is disposed in the enclosed void of material, and in contact with at least one of the substantially planar body, the first sidewall, and the ledge of the display mount frame, and wherein, in the attached state, the protrusion and the chamfered corner are disposed inside the interior space of the gaming machine.

* * * * *